Figure 1:
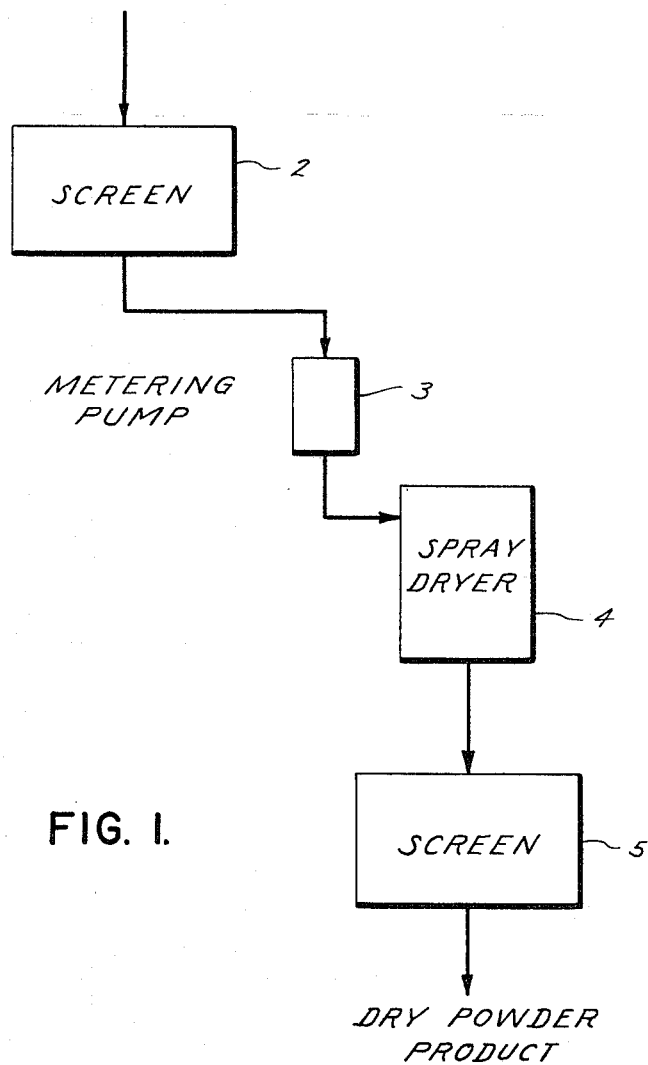

Oct. 4, 1966   C. F. TALBOT   3,276,966
PROCESS FOR TREATING USED OIL AND GAS WELL DRILLING
LIQUIDS TO RECOVER THE DESIRED COMPONENTS THEREOF
IN A DRY POWDER FORM
Filed Oct. 15, 1962   2 Sheets-Sheet 1

FIG. I.

Charlie F. Talbot
INVENTOR.

BY *Hayden & Pravel*

ATTORNEYS

[Patent No.] 3,276,966
Patented Oct. 4, 1966

3,276,966
PROCESS FOR TREATING USED OIL AND GAS WELL DRILLING LIQUIDS TO RECOVER THE DESIRED COMPONENTS THEREOF IN A DRY POWDER FORM
Charlie F. Talbot, 3715 Turnberry Circle, Houston, Tex.
Filed Oct. 15, 1962, Ser. No. 231,326
5 Claims. (Cl. 175—66)

This application is a continuation-in-part of my prior copending application Ser. No. 159,302, filed Dec. 14, 1961, now abandoned.

The present invention relates to a process for reclaiming oil well drilling liquids, and more particularly, to a process for recovering oil well drilling liquids and reducing the components thereof to a dry, sized, and uncontaminated powder product.

In the drilling of oil and gas wells by the rotary method, a drilling liquid is used during drilling operations, the liquid being discharged downwardly through the drill string and out the drill bit at the lower end of the drilling string and then circulated up through the well bore to the earth's surface where it is then recirculated back down into the well bore. This process continues throughout drilling operations, and it can be appreciated that during any particular drilling operation, a substantial amount of substances may be mixed in the drilling liquid to give it the desired consistency and characteristics. A substantial investment in any oil or gas drilling operation is the cost of the liquid used in the drilling operation, and at the present time, an effort is made to transport these liquids from one location to the next in order to reuse the drilling liquid.

However, this is not desirable in that the used drilling liquids may contain oil or gases picked up during previous drilling operation as well as fossils or other foreign substances which may give false oil or gas readings or indications in any other well in which the drilling liquid may be used.

The gas picked up in the drilling fluid during the drilling operation materially affects the weight of the drilling liquid in some instances reduces the weight to a point so that the gas must be first removed before the drilling liquid can be reused.

Present methods and apparatus employed to remove the gas from drilling liquid is expensive and does not necessarily remove all gas from the liquid. Also present methods may cause undesirable or deleterious changes in the particle size or consistency of the desirable solids.

The present invention relates to a process for recovering the valuable components of used oil and gas well drilling liquids whereby they may be reused in subsequent drilling operations as many times as desired to thereby substantially reduce the costs of well drilling liquids.

Still another object of the present invention is to provide a process for treating used oil and gas well drilling liquids whereby the valuable constituents of the drilling liquids may be recovered in a dry powder form, which dry product has had removed therefrom undesirable constituents which might otherwise interfere with reuse of the product.

Another object of the invention is to utilize waste heat at a drilling rig for recovering drilling liquids in a usable form.

Still another object of the invention is to provide a process for treating used drilling liquids and reduce them to a dry form for subsequent reuse.

A further object of the invention is to provide a process of recovering drilling liquids in dry form in which the feed stream of drilling liquids is regulated so as to attain a desired particle size of dry materials as the end product.

A further object is to provide a method and apparatus for positively removing all gas and oil and other combustibles from used drilling liquids and which does not change the desired nature of desirable solids in the drilling liquids.

Figure 2:
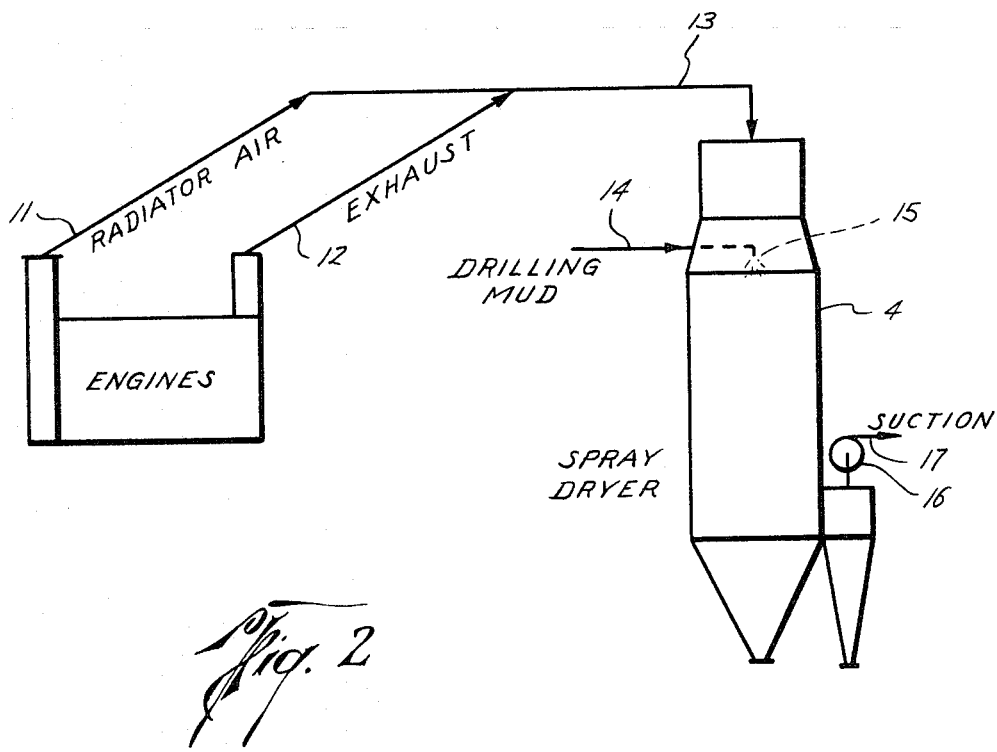

Other objects and advantages of the present invention will become more apparent from a consideration of the following description and drawings wherein:

FIG. 1 is a schematic flow sheet arrangement showing an embodiment of the process of the present invention; and FIG. 2 is another scehmatic flow sheet illustrating a manner of recovering waste heat from a drilling rig and utilizing it in the invention.

As previously noted, the present invention is particularly adapted to treating well drilling liquids whereby they may be transported to other well sites with a minimum of effort for reconstitution by mixing with water and subsequent use. The present invention also has particular advantage in that it eliminates any undesirable constituents from the drilling mud or liquid which might otherwise interfere with drilling operations at the new location.

It can be further appreciated that the process of the present invention may be practiced at a fixed location with the liquid mud being transported to the location, or if desired, the processing equipment may be mounted on a truck, and the truck or trailer moved to various well sites and the mud at each location treated so as to reduce it to a dry powder form, in which form it may be moved in bulk to other locations or sacked for future use.

As illustrated in FIG. 1 of the drawings, the well drilling liquid which has been used at a well location is pumped from the pit or mud tank at the well site, and if the present invention is a portable arrangement, the oil and gas drilling liquid may be pumped directly onto a screen so as to remove trash therefrom. It is not uncommon in drilling operations for gloves, rags, or other foreign objects to be dropped down the well and thereby become mixed with the well drilling liquid. It is necessary to remove trash and relatively large foreign objects from the mud before it can be successfully treated in accordance with the present invention, and to this end, a suitable screen mesh in the order of 10 to 30 mesh screen may be employed and through which the used drilling liquid is first circulated. This is represented by the numeral 2 in the drawing, and after the used drilling liquid has been screened, it may be conducted to the metering pump 3 which discharges the desirable volume of used oil and gas drilling liquid into the spray dryer so that the drying thereof may be accomplished in an efficient and quick manner.

The spray dryer as illustrated in FIG. 1 may be of conventional form such as that manufactured by Nichols Engineering & Research Corporation and as illustrated in their bulletin 239. Normally, in this type of dryer, hot gases are circulated through the dryer as the fine particles of liquid are discharged into the dryer. The hot gases serve to evaporate the water vapor from the liquid.

However, in connection with the present invention, critical care must be exercised in properly drying the used oil and gas drilling liquid in that improper heating or overheating of the used liquids will ruin certain components in them and make them useless for future oil and gas drilling operations. More particularly, I have discovered that a temperature above approximately 350° F.–400° F. in the dried product will tend to destroy the desirable and necessary characteristics of certain components in the product. Therefore, the drying operations should therefore be carried out so that the temperature of the dry product produced should not exceed the range of approximately 350° F.–400° F.

It is entirely likely that the temperature of the hot gases passing through the dryer may reach as much as 850° F. or even more, but the volume of liquid discharged to the dryer and the temperature of the hot gases are controlled so that the temperatue of the dry product does not exceed approximately 350° F.–400° F.

I have discovered that when the temperature 350° F.–400° F. in the dry product, certain components in the product will not react properly when subsequently mixed with water in future drilling operations. This is extremely important because the critical characteristics of the components of the dry powder must be maintained if the product is to be successfully reused at its optimum value. The drying of the liquids not only removes the water vapor, but it also removes other volatile substances including any hydrocarbons such as oil or gas which may be occluded in the liquids or which may have collected in the used oil and gas drilling liquid from the previous drilling operation, and it can be appreciated that this is extremely desirable. Elimination of hydrocarbon substances including oil and gas will reduce the possibility of false oil or gas shows or indications when the dry product is later mixed with water for subsequent use and also eliminate absorbed gases that would reduce weighting characteristics of the drilling liquid.

After the drying operation, the dry product should be screened through at least 125 mesh screen or below in order to remove fossils from the dry product. This is represented at 5 in FIG. 1 of the drawings. It can be appreciated that as the liquid is circulated in the well bore, it will pick up from the cuttings in the well bore as well as from the well bore wall itself foreign substances of minute character which may be of significance in determining the presence of oil or gas bearing formations. It is, of course, necessary to remove these fossils and other substances from the dry product before it is reused so as to eliminate the possibility of causing false oil or gas bearing formation indications in the dry product when it is reused in subsequent well drilling operations.

After the above screening, the material may be discharged in bulk for transport to future locations and then mixed with water, whereupon it returns to its original consistency and can be immediately discharged into the well. If desired, the dry product may be sacked and stored for future use.

The process of the present invention also contemplates drying the drilling liquid in a manner so that subsequent grinding or milling of the dried product is reduced to a minimum, if not substantially eliminated.

One method of accomplishing this result is to discharge the drilling liquid from the metering pump 3 through an orifice and into the dryer 4 so as to obtain a fine mist of liquid particles against which the hot gases in the dryer impinge. The increased surface area of the drilling liquid thus causes a more efficient heat transfer or exchange between the drying gases and the liquid and the initial discharge of the liquid into the dryer in the manner described along with the substantial rapid drying produces a dry, powdery product which requires substantially no milling or grinding before reuse.

For example, a 3/32 inch or 3/16 inch nozzle with a discharge into the dryer 4 at the rate of approximately 10 gallons per minute should accomplish the desired results.

Where the dryer 4 is of substantial size, the liquid may be discharged into the dryer 4 on a rotating drum or disc, and this in turn will effect the atomizing of the liquid as above described.

Still another method which may be used is to aspirate the drilling liquids into the dryer 4 with an inert gas or volatile liquid so as to form a fine spray.

In FIG. 2 of the drawings, there is shown a flow sheet in which waste exhaust heat is utilized in the drying of the drilling liquids. The engine used in drilling operations, such as a diesel or the like, is shown at 10. The exhaust radiator air or exhaust from the engine 10 are represented at 11 and 12, respectively, and are conducted through manifold 13 to dryer 4. The liquid drilling mud is circulated through line 14 and discharged through spray nozzle 15 into dryer 4.

A suction fan 16 draws the hot exhaust gases through manifold 13 and through dryer 4 to dry the liquid mud. The dry material may be withdrawn through the bottom of the dryer and the volatile materials will be discharged at 17.

The distinct advantage of the present invention is that the undesirable constituents of the used oil and gas drilling liquid have been removed while retaining the desired constituents including chemicals which were originally added to the mud. As noted hereinbefore, substantial sums of money are invested in oil and gas well drilling operations to provide proper drilling liquid having the desired consistency and constituents. In the course of drilling a well, many valuable and expensive chemicals and other substances may be added to the mud fluid, and heretofore reuse of the drilling liquid has been substantially impossible in view of the contaminants in the drilling fluid and for other reasons, some of which are noted above.

The present invention provides an arrangement whereby these contaminants may be quickly and easily removed without deleterious effects on the drilling fluid, and the fluid is reduced to a dry powder form so that it can be reused in subsequent drilling operations.

Also, the present invention provides a method and apparatus which completely removes any combustible gas and oils from the used drilling liquids. The temperatures above mentioned in the spray dryer are sufficiently high so that any gas or oil picked up by the drilling liquid may be burned and thereby removed from the product. Also, the present invention has the desirable effect of removing all of the combustible gases and liquids from the drilling fluid and accomplishes this result in a relatively inexpensive manner as compared with former procedures.

What is claimed is:

1. A method for the reclamation of used oil and gas drilling liquids with component minerals and chemicals in a dry undamaged state, which may be reconstituted for use in subsequent drilling operations comprising the steps in the order named:
    (a) separating trash from the used oil and gas well drilling liquids,
    (b) conducting the liquids to a spray dryer and drying them at a temperature so that the temperature of the dried product does not exceed approximately 350° F., and
    (c) screening the dried product to remove fossils and fine cuttings from the dried product.

2. A method of treating used oil and gas well drilling liquids to remove undesirable constituents therefrom while recovering the desired components in a dry product form comprising the steps in the order named:
    (a) screening the drilling liquid to separate trash therefrom,
    (b) drying the liquid in a spray dryer to remove volatile substances therefrom and to produce and dry product, the drying temperature being maintained so that the temperature of the dry product does not exceed approximately 350° F., and
    (c) screening the dried product through approximately 125 mesh screen to remove fossils and other impurities from the dried product.

3. A method of treating used oil and gas well drilling liquids to remove undesirable constituents therefrom and to recover a dry product which when mixed with water may be reused comprising the steps of:
    (a) screening the liquid through screen mesh in the range of approximately 10 through 30 mesh to remove trash and large objects therefrom,
    (b) conducting the liquids to a spray dryer to remove volatile substances therefrom and to produce dry powder product, and (c) screening the dry powder product through 125 mesh screen or below to remove fossils from the dried product.

4. A method for the reclamation of used oil and gas drilling liquids with component minerals and chemicals in a dry undamaged state, which may be reconstituted for use in subsequent drilling operations comprising the steps in the order named:
 (a) separating trash from the used oil and gas well drilling liquids,
 (b) conducting the liquids to a spray dryer and drying them at a temperature so that the temperature of the dried product does not exceed approximately 350° F. to thereby combust gas and other combustibles picked up by the drilling liquids during drilling operations, and
 (c) screening the dried product to remove fossils from the dried product and other impurities including fine cuttings.

5. A method of treating used oil and gas well drilling liquids to remove undesirable constituents therefrom and to recover a dry product which when mixed with water may be reused comprising the steps of:
 (a) screening the liquid through screen mesh in the range of approximately 19 through 30 mesh to remove trash and large objects therefrom,
 (b) conducting the liquids to a spray dryer to remove volatile substances therefrom and to produce dry powder product and to burn any entrained and trapped gas and oil in the drilling liquid, and
 (c) screening the dry powder product through 125 mesh screen or below to remove fossils from the dried product.

References Cited by the Examiner

UNITED STATES PATENTS

| | | | |
|---|---|---|---|
| 1,561,971 | 11/1925 | Coffin et al. | 159—40 |
| 1,961,232 | 6/1934 | Maust et al. | 252—8.5 |
| 2,218,533 | 10/1940 | Huebotter | 175—66 |
| 2,334,621 | 11/1943 | Goodell | 260—124 |
| 2,590,905 | 4/1952 | Tomlinson et al. | 159—4 |
| 2,756,965 | 7/1956 | Howe | 175—66 |
| 2,833,345 | 5/1958 | Vander Pyl | 159—4 |
| 2,858,271 | 10/1958 | Byrd | 252—8.5 |
| 2,870,990 | 1/1959 | Bergey | 175—66 |
| 3,039,545 | 6/1962 | Rogers | 175—66 |

FOREIGN PATENTS 209,148 12/1923 Great Britain.

OTHER REFERENCES

Rogers: Composition and Properties of Oil Well Drilling Fluids, second edition, published 1953 by Gulf Pub. Co. of Houston, Tex., pp. 57 to 60.

LEON D. ROSDOL, *Primary Examiner.*

JULIUS GREENWALD, *Examiner.*

H. B. GUYNN, *Assistant Examiner.*